United States Patent [19]

Sawamura et al.

[11] Patent Number: 5,247,451
[45] Date of Patent: Sep. 21, 1993

[54] METHOD FOR ESTABLISHING DATA DEFINING A TOOL PATH FOR A NUMERICALLY CONTROLLED MACHINE WITHOUT ESTABLISHING OFFSET PLANE DATA

[75] Inventors: Jun Sawamura, Kanagawa; Tetsuzo Kuragano, Tokyo, both of Japan

[73] Assignee: Sony Corporation, Tokyo, Japan

[21] Appl. No.: 642,648

[22] Filed: Jan. 17, 1991

[30] Foreign Application Priority Data

Jan. 21, 1990 [JP] Japan .................................. 2-010871

[51] Int. Cl.$^5$ ...................... G06F 15/60; G06F 15/46
[52] U.S. Cl. ............................ 364/474.2; 364/474.24
[58] Field of Search ............ 364/474.2, 474.24, 474.34, 364/474.19, 191

[56] References Cited

U.S. PATENT DOCUMENTS

| | | | |
|---|---|---|---|
| 4,513,366 | 4/1985 | Munekata et al. | 364/474.26 |
| 4,558,977 | 12/1985 | Inoue et al. | 364/484.04 |
| 4,707,793 | 11/1987 | Anderson | 364/474 |
| 4,789,931 | 12/1988 | Kuragano et al. | 364/474.18 |
| 4,819,192 | 4/1989 | Kuragano et al. | 364/522 |
| 4,866,631 | 9/1989 | Kuragano et al. | 364/474.29 |
| 5,043,906 | 8/1991 | Jepson | 364/474.24 |

FOREIGN PATENT DOCUMENTS

0081590A1 6/1983 European Pat. Off. .
0359378A2 3/1990 European Pat. Off. .

Primary Examiner—Jerry Smith
Assistant Examiner—Paul Gordon
Attorney, Agent, or Firm—Philip M. Shaw, Jr.

[57] ABSTRACT

A method for generating data defining a tool path for a numerically controlled machine is designed for generating machining tool path data without establishing offset plane data so that the machining tool path depth data can be established for discontinuous, surfaced, offset planes which might otherwise cause interference in the tool path. The method includes the steps of forming a plurality of patches defining a three-dimensional plane to be machined, subdividing each patch into a predetermined number of segments as divided by a plurality of dividing points, with the number of segments being variable depending upon the distance between adjacent dividing points so that the distance is maintained to be smaller than the machining area of a machine tool. The machining depth at each dividing point within the tool path is derived with respect to the maximum height position at which the machining tool comes into contact with the dividing point. The machining depth is modified with a correction value which is determined in terms of the surface condition of the surface to be machined.

12 Claims, 10 Drawing Sheets

METHOD FOR ESTABLISHING DATA DEFINING A TOOL PATH FOR A NUMERICALLY CONTROLLED MACHINE WITHOUT ESTABLISHING OFFSET PLANE DATA

BACKGROUND OF THE INVENTION

1. Field of the Invention

The present invention relates generally to a method for generating offset surface data. More particularly, the invention relates to a method for generating offset surface data particularly applicable in designing and manufacturing of contoured products utilizing data representing a free surface generated through computer aided design (CAD) and/or computer aided manufacturing (CAM) for example.

2. Description of the Background Art

In the case where the contour of the object defined by the free surface is designed using CAD technique (so called, geometric modeling), the designer generally specifies a plurality of points (articulation points) in a three dimensional coordinate system through which the surface is to pass and uses a computer to calculate a boundary line network interconnecting the plurality of specific articulated points on the basis of desired vector functions. A surface represented by a "wire frame" is thus generated. In this way, a multiple number of frame spaces enclosed with boundary lines can be formed. Such a process is called frame processing.

The boundary line network formed through the above-mentioned frame processing represents a rough sketch to be designed by the designer. If a surface which can be represented by predetermined vector functions using boundary lines enclosing each frame space can be interpolated, the free surface desired by the designer (which is impossible to specify by means of a quadratic function) can, as a whole, be generated.

The surface extended over each framed space forms a basic element constituting the whole surface and is called a "patch".

To provide a more natural outer contour for the generated entire free surface, a free surface generating method has been proposed in which a control side vector around a common boundary is set again so as to extend a patch to satisfy the condition of continuity of the osculating planes at the common boundary bridging the two frame spaces.

U.S. Pat. No. 4,819,192 exemplifies the above-mentioned free surface generating method. The free surface generating method disclosed in the aforementioned United States Patent will be described with reference to FIGS. 10 and 11.

Figure 10:
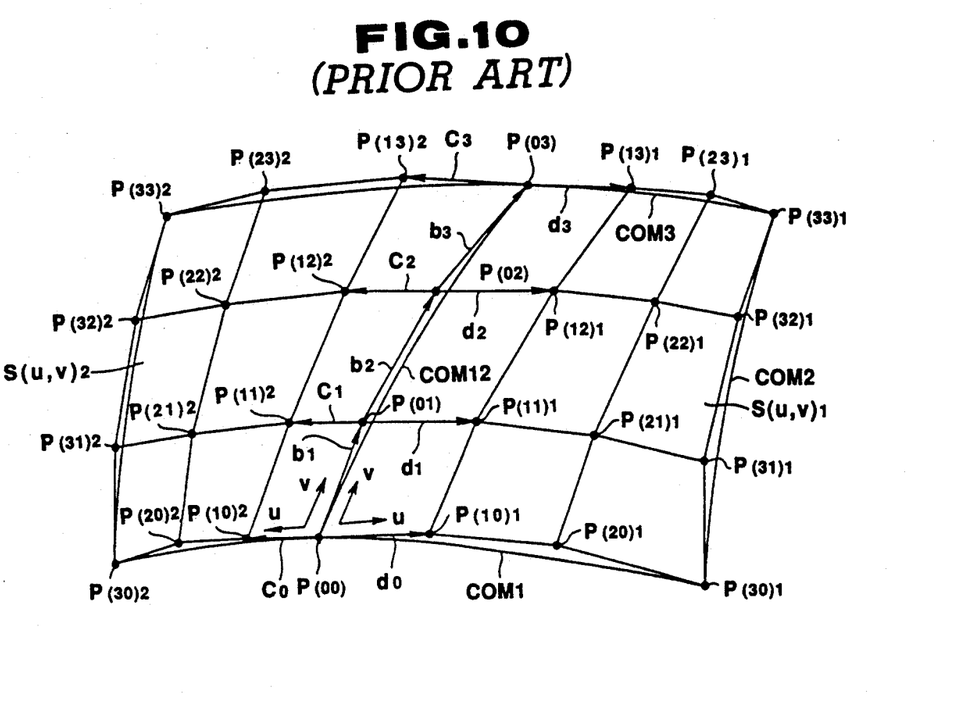
FIG. 10 is a explanatory illustration showing the connection between adjacent patches in a prior art method.
Figure 11:
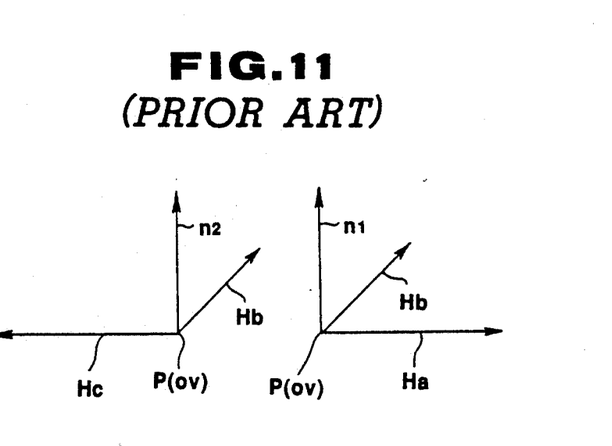
FIG. 11 is an explanatory illustration for explaining continuity of surfaces in a prior art method.

In the case where two patches $S(u, v)_1$ and patches $S(u, v)_2$ are smoothly connected to each other, e.g., as shown in FIG. 10, control side vectors $a_1$, $a_2$, $c_1$ and $c_2$ so as to establish a condition of continuity of the osculating plates are, in principle, set on a common boundary COM 12 bridging adjoining patches $S(u, v)_1$ and $S(u, v)_2$ on the (basis of articulated points $P(00)$, $P(30)_1$, $P(33)_1$, $P(03)$, $P(33)_2$ and $P(30)_2$ derived through the frame processing internal control points $P(11)_1$, $P(12)_1$, $P(11)_2$ and $P(12)_2$ which are set once again by means of these control side vectors.

If the above-described techniques is applied to other common boundaries, the two patches $S(u, v)_1$ and $S(u, v)_2$ can be smoothly connected to other adjoining patches under the condition of continuity of the osculating planes. It is noted that "osculating plane" means a plane formed by tangent vectors in the u and v directions at each point of the common boundary For example, when at each point on the common boundary COM 12 of FIG. 10, the osculating planes of the patches $S(u,v)_1$ and $S(u, v)_2$ are the same, the condition of continuity of the "osculating planes" is established.

In detail, the condition of continuity of the osculating planes at a point (o, v), wherein u=o and v=v, on the common boundary COM 12, is determined as shown in FIG. 10. That is to say, for the one patch $S(u, v)_1$ a normal vector $n_1$ for a tangent vector Ha in a direction traveling the common boundary COM 12 (i.e., u direction) and a tangent vector Hb in a direction along the common boundary COM 12 (i.e., v direction) can be expressed in the following equation:

$$n_1 = Ha \times Hb \tag{1}$$

In addition, for the other patch $S(u, v)_2$ a normal vector $n_2$ for a tangent vector Hc in a direction traversing the common boundary COM 12 and a tangent vector Hb in a direction along the common boundary COM 12 can be expressed in the following equation:

$$n_2 = Hb \times Hc \tag{2}$$

Since the two sets of tangent vectors Ha, Hb and Hc must be present on the same plane, respectively, to establish the condition of continuity of the osculating planes under such a condition as described above, the two normal vectors $n_1$ and $n_2$ are consequently directed in the same sense.

To achieve this condition for the two normal vectors $n_1$ and $n_2$, the internal control points $P(11)_1$, $P(21)_1$, $P(12)_1$, $P(22)_1$ and $P(11)_2$, $p(21)_2$, $p(12)_2$, $p(22)_2$ may be set so as to establish the following equation:

$$\lambda(v) \cdot \frac{\partial \cdot S(u, v)_2}{\partial u} = \mu(v) \cdot \mu \frac{\partial \cdot (Su, v)_1}{\partial u} + v(v) \cdot \frac{\partial \cdot S(u, v)_1}{\partial v} \tag{3}$$

In the equation (3), $\lambda(v)$, $\mu(v)$ and $(v)$ denote scalars.

Furthermore, the patches $S(u, v)_1$ and $S(u, v)_2$ are represented using a vector function $S(u,v)$ of a cubic Bezier equation:

$$S(u, v) = (1-u+uE)^3 \cdot (1-v+vF)^3 \cdot P_{(00)} \tag{4}$$

It is noted that u and v denote parameters in the u direction and in the v direction and E and F denote shift operators.

Figure 12A:
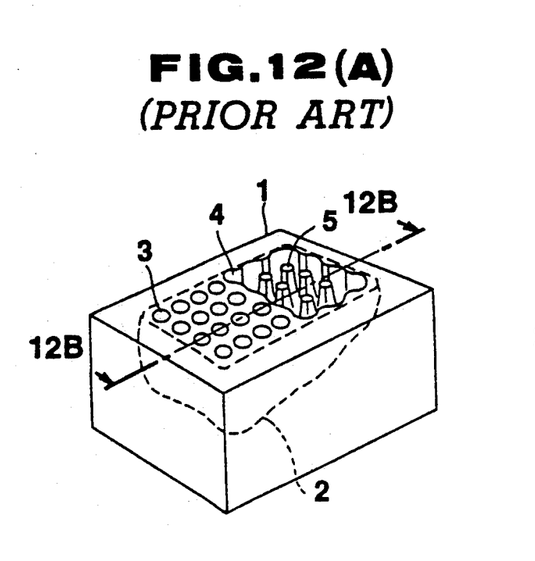
FIGS. 12A, 12B, 13, 14, and 15 are explanatory illustrations showing the manner of generation of machining data in the prior art.
Figure 12B:
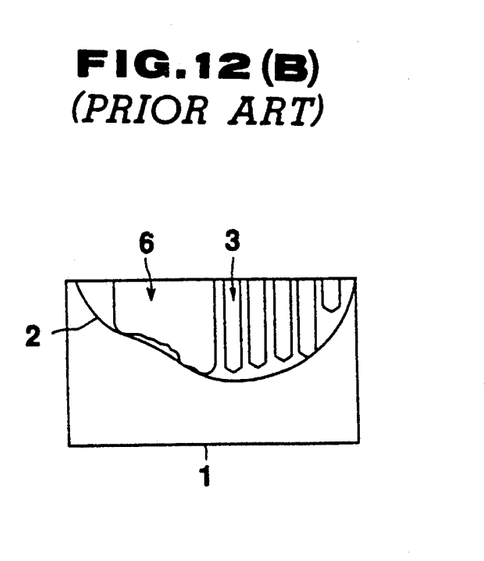

In the practical production, an article defined by a plurality of patches $S(u, v)$, $(S(u, v)_1, S(u, v)_2...)$ is formed by utilizing a female or reversed configuration die. For this, such a female or reversed configuration die has to be prepared. Practically, such a female die is made from a rectangular parallel-piped configuration of a material block. The material block 1 (FIG. 12(A)) is drilled to remove extra material to form a plurality of straight bores 3 respectively having depths substantially corresponding to the depths of the die recess at the corresponding position according to the desired configuration of the curved surface 2, as shown in FIG. 12(A). Subsequently, the remaining materials 4 and 5 are removed by means of a ball end mill to form the recess 6 (FIG. 12(B)). Such a machining process may require approximately 70% of the process period for producing the female die. The process illustrated herein successfully reduces the process time for the aforementioned rough machining. Therefore, with the shown process, the efficiency in production of the female die can be significantly improved.

Figure 13:
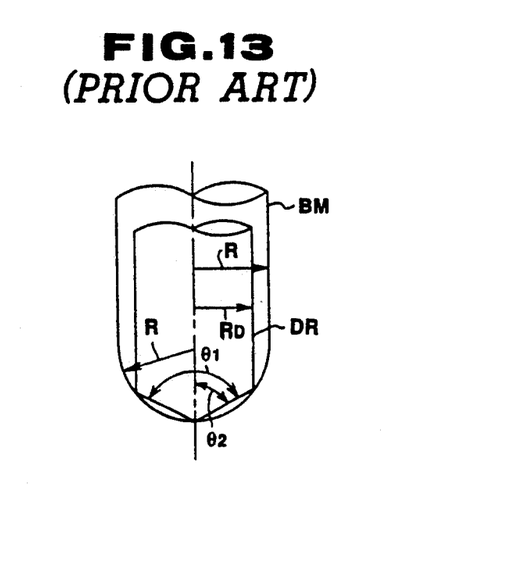

Here, as shown in FIG. 13, the radius $R_D$ and the curve radius R of a drill DR and ball end mill BM are diametrically selected to satisfy the following equation:

$$R_D = 0.8R \tag{5}$$

The drill DR is provided with a working edge angle $\theta_1(=2\theta_2)$ at the working edge and the ball end mill has essentially a semisphere head. By means of the drill DR and the ball end mill BM, the machining processes are performed utilizing identical machining data which define the path of the tools.

The machining data for defining the path of the tool for machining a free or random surface is determined in the process disclosed in U.S. Pat. No. 4,789,931.

Figure 14:
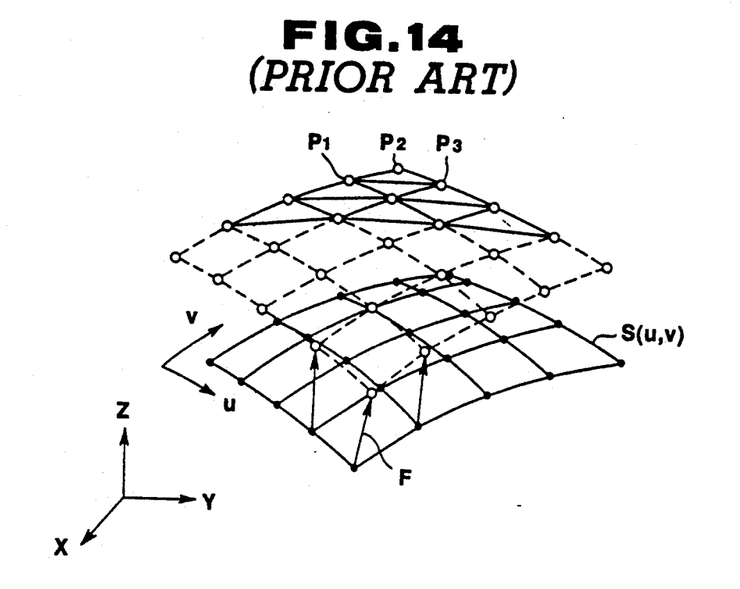

Namely, as shown in FIG. 14, among all of patches defining the free or random surface 2 of the female die, a randomly selected patch S(u, v) is separated into a predetermined number of segments. In the example of FIG. 14, the patch S(u, v) is separated or divided into sixteen segments by dividing it into four segments in the respective u and v directions. Then, the parameters are thus divided into the u and v directions. Tangent vectors n at the respective dividing points are obtained (e.g. see FIG. 11). Thereafter, the offset vector F at each dividing point is derived on the basis of the tangent vector n and the curve radius R of the ball end mill. The magnitude of the offset vector F can be expressed with the equation:

$$F = Rn \tag{6}$$

Then, offset points $P_1, P_2, P_3...$ are derived from the offset vector thus derived. By connecting three mutually adjacent offset points, a triangular plane $P_1$-$P_2$-$P_3$ is established. By this, an offset surface defined by a plurality of triangular planes can be defined.

For generating free or random surface machining data, three dimensional machining point matrix MTX is projected on a two-dimensional X-Y plane. The matrix MTX covers all surface configurations and is constituted by a plurality of machining points (at the intersection of the grid lines) separated by a pitch determined on the basis of the radius $R_D$ of the drill DR and the curve radius R of the ball end mill BM. In the X-Y coordinate system of the X-Y plane, respective ones of the machining points can be defined by the x- and y-coordinates $(x_{ij}, y_{ij})$.

Figure 15:
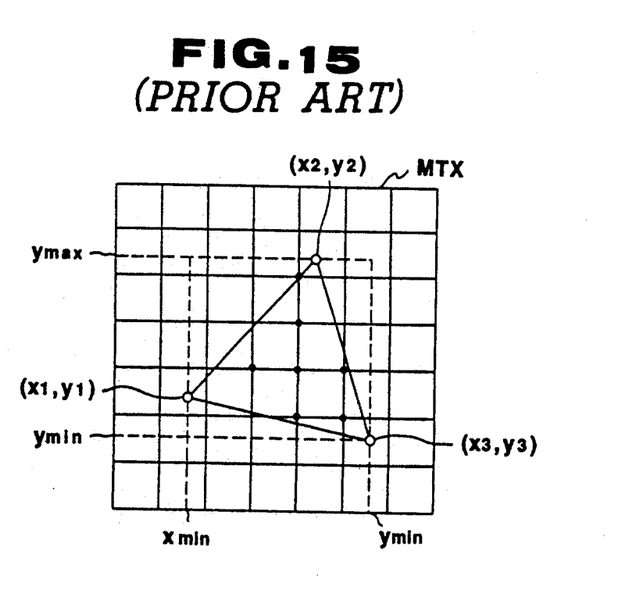

Subsequently, with respect to the triangular plane projected on the matrix MTX and defined by the coordinates $(x_1, y_1)$, $(x_2, y_2)$ and $(x_3, y_3)$, regions defined by $(x_{min}, x_{max})$ and $(y_{min}, y_{max})$, in which machining points $(x_{ij} u_{ij})$ to determine the machining data are present, as shown in FIG. 15. Then, with respect to each machining point, a determination is made of whether it is within the projection of the triangular plane on the matrix MTX. For the machining points oriented within the projection of the triangular plane as identified by solid dots in FIG. 15, the height $z_{ij}$ is derived by the foregoing equation (6). The height $z_{ij}$ thus derived represents the offset magnitude at the corresponding machining point. By repeating the foregoing process for all of the machining points and for all of the triangular planes, machining data is derived including orientation $(x_{ij}, y_{ij})$ of the machining point with height data $z_{ij}$. Therefore, each grid point on the matrix MTX can be defined. Such machining data is suitable for rough machining by means of a drill and ball end mill.

Figure 16:
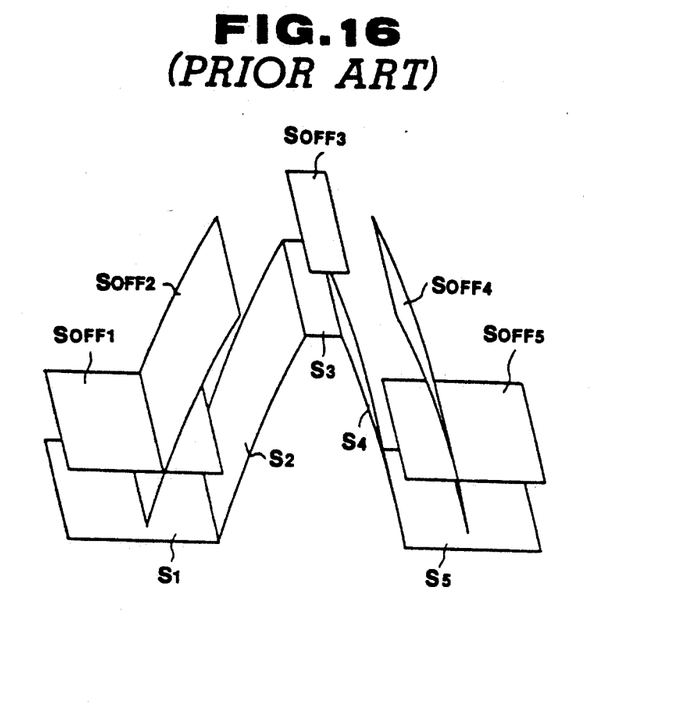
FIG. 16 is an explanatory illustration showing an example of a surface configuration having discontinuous surfaces in the prior art.

The foregoing process is successful for deriving machining data as long as the adjacent offset planes form a continuous surface. However, in the case that the surface to be machined has a discontinuity such as that shown in FIG. 16, difficulty is encountered in generating the machining data. For instance, in the example of FIG. 16, if the random surface to be machined is constituted of the patches $S_1, S_2, S_3, S_4, S_5..$, the offset planes $S_{off1}, S_{off2}, S_{off3}, S_{off4}, S_{off5}..$, become discontinuous. As can be seen, in the shown example, the offset planes $S_{off2}, S_{off3}$ and $S_{off3}, S_{off4}$ of the surfaces $S_2, S_3$ and $S_3, S_4$ form a discontinuous surface to make it impossible to form grid points.

For solving this problem, U.S. Pat. No. 4,866,631, which has been assigned to the common assignee to the present invention, proposes a process which enables the generation of an offset surface when a discontinuity of the offset surfaces is established with respect to the surface to be machined.

Figure 17:
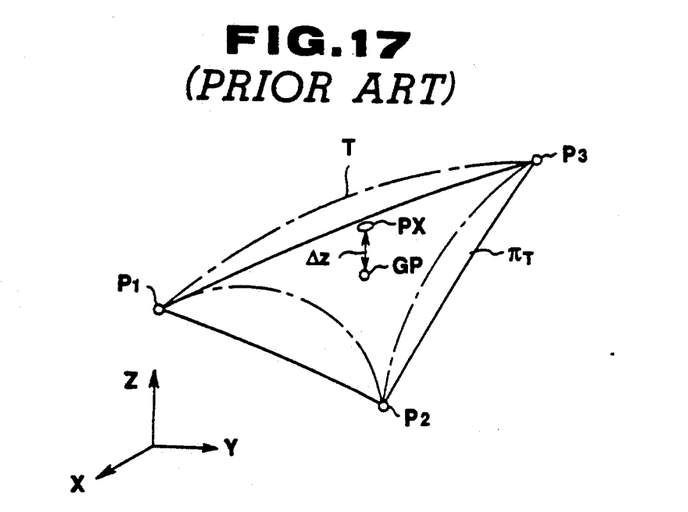
FIG. 17 is an explanatory illustration of how error in the generation of the machining data can occur in the prior art method.

Although the process proposed in the aforementioned U.S. Pat. No. 4,866,631 is successful in generating the offset surface despite the presence of discontinuity, a large amount of arithmetic data processing is required. Therefore, when the surface to be machined consists of complex configurations and thus has a large number of patches, the process time becomes substantial. Furthermore, in the proposed process, the triangular planes forming the offset planes are formed by dividing parameters into a predetermined number which is fixed irrespective of the size of the patch. Therefore, as shown in FIG. 17, greater error between the offset surface T and the approximated triangular plane $\pi_T(P_1$-$P_2$-$P_3)$ can be induced for a greater patch. As a result, the grid points GP formed on the triangular plane $\pi_T$ tend to be oriented at lower elevations than the point Px on the surface to be machined in a magnitude $\Delta Z$. Therefore, the problem of excessive machining can arise.

Furthermore, determining whether the grid points are oriented within or out of the triangular project prolongs the process time.

SUMMARY OF THE INVENTION

Therefore, it is an object of the present invention is to provide a method for generating free surface machining data while solving the problems set forth above.

Another object of the present invention to provide a method for generating rough depth machining data based on the free surface data without using an offset surface.

A further aspect of the invention to provide a method for generating rough depth machining data while successfully avoiding excess machining.

In order to accomplish the aforementioned and another objects, a method for generating data defining the machining depth of a tool path for a numerically controlled machine, according to the present invention, generates machining tool path depth data without establishing offset plane data so that the machining tool path depth data can be established for discontinuous, surfaced, offset planes which might otherwise cause interference in the tool path. The method includes the steps of forming a plurality of patches defining a three-dimensional plane to be machined and dividing each patch into a predetermined number of segments as divided by a plurality of dividing points. The number of segments is variable depending upon the distance between adjacent dividing points so that the distance is maintained to be smaller than the machining area of a machine tool. The machining depth at respective ones of a plurality of the dividing points is then derived with respect to the maximum height position at which the machining tool comes into contact with the dividing point. The machining depth is then modified with a correction value which is determined in terms of the surface condition of the surface to be machined.

According to one aspect of the invention, a method for establishing data defining the machining depth of a tool path for a numerically controlled machine of the type having a machining tool of a known configuration from data defining a three-dimensionally curved surface comprises the steps of:

(a) dividing the three-dimensionally curved surface into a plurality of patches;

(b) subdividing each of the patches for establishing a plurality of dividing points;

(c) comparing the distance between adjacent dividing points with given value which is derived in relation to the size of the machining tool;

(d) re-subdividing some of the patches until all of the distances between each of the adjacent dividing points become smaller than a given value, where the distance as compared at the step (c) is greater than the given value;

(e) projecting the patches formed in step (d) onto a three dimensional machining matrix projected onto an X-Y plane, projecting the machining tool onto the machining matrix in the X-Y plane and selecting those patches whose projections on the machining matrix are located within the projection of the machining tool;

(f) selecting a plurality of grid points on the machining matrix which lie within the projection of the patches determined in step (e) and which are inside of the projection of the machining tool onto the X-Y plane;

(g) calculating the maximum height of the center of the machining tool when the machining tool contacts with each of the dividing points; and (h) adding a predetermined correction value to the maximum height for determining the height position of the machining tool in the tool path.

Preferably, the predetermined correction value ($Z_{AD}$) is derived from one of the following equations:

$$Z_{AD} = \delta$$

$$Z_{AD} = (R^2 - (\sqrt{3}/2 \times R_{ref})^2)^{\frac{1}{2}} + \delta$$

$$Z_{AD} = R_{ref} + \delta$$

where
R is radius of the machining tool;
$R_{ref}$ is a reference value ($R_{ref} \leq R$); and
$\delta$ is a Value corresponding to a finishing margin.

Also, the dividing points satisfying the following formula may be selected as dividing points oriented within the section area of the machining tool:

$$(x_i - x_a)^2 + (y_i - y_a)^2 \leq R^2$$

where
$x_i$, $y_i$ are x- and y-coordinate components of a grid point within the section area;
$x_a$, $y_a$ are x- and y-coordinate components of the grid point at which the center of the machining tool is located; and
R is the radius of the machining tool.

BRIEF DESCRIPTION OF THE DRAWINGS

The present invention will be understood more fully from the detailed description given herebelow and from the accompanying drawings of the preferred embodiment of the invention, which, however, should not be take to limit the invention to the specific embodiment but are for explanation and understanding only.

In the drawings.

DESCRIPTION OF THE PREFERRED EMBODIMENT

Figure 1:
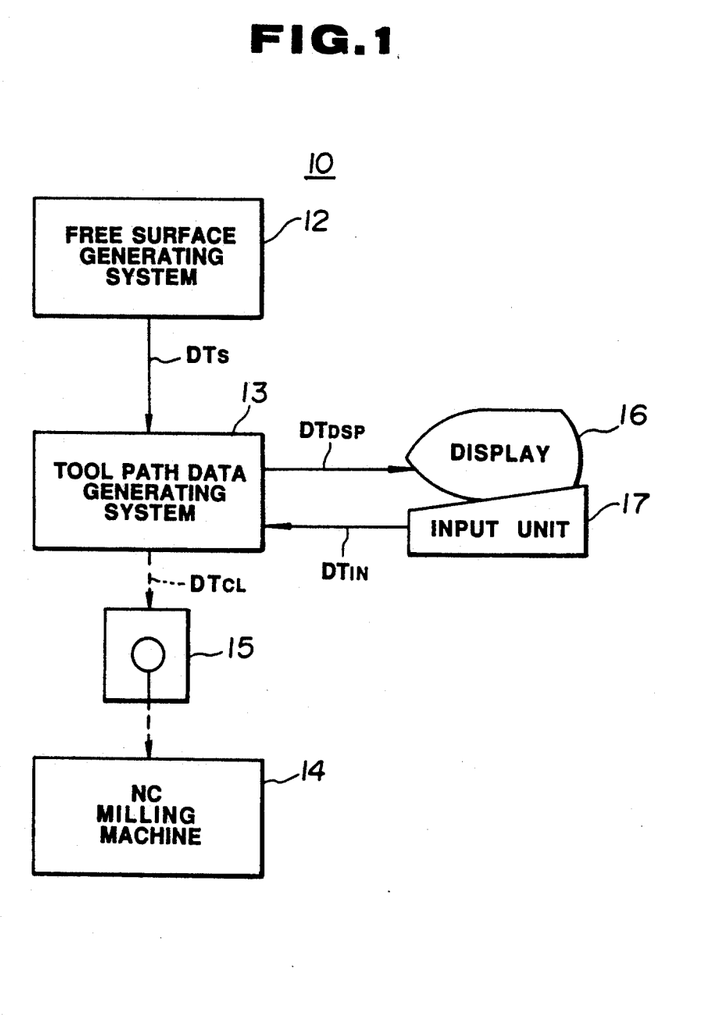
FIG. 1 is a block diagram of CAD/CAM system employing the preferred embodiment of a machining data generating method according to the present invention.

Referring now to the drawings, particularly to FIG. 1, the preferred embodiment of a machining data generating method, according to the present invention, is applicable for a CAD/CAM system as illustrated. The CAD/CAM system is generally represented by the reference numeral "10". The CAD/CAM system 10 includes a free or random surface generating system 12, a tool path data generating system 13 and a numerically controlled (NC) milling machine (machining center) 14. Respective of the free or random surface generating system 12, the machining data generating system 13 and the NC milling machine (machining center) 14 are each provided with their own CPUs.

The free surface generating system 12 generates the outer surface data $DT_s$ of a desired configuration of the article, which outer surface is defined by a plurality of interconnected quadrilateral patches S(u, v). For generating the outer surface data $DT_s$, CAD technology may be used. The tool path data generating system 13 receives the outer surface data $DT_s$ from the free surface data generating system 12. Based on the received outer surface data $DT_s$, the tool path data generating system 13 generates machining data for rough machining by means of a drill DR and a ball end mill BM. Then, the machining data generating system 13 generates tool path data $DT_{CL}$ on the basis of the machining data.

The tool path data $DT_{CL}$ is supplied through an appropriate medium, such as a floppy disk, on-line network and so forth, to the machining center 14. In the machining center, the drill DR and the ball end mill BM are driven through the tool path defined by the tool path data $DT_{CL}$ to perform rough machining. Through the process set forth above, a female die 1 (see FIGS. 12(A) and 12(B)) for production of the desired outer surface configuration can be rough machined.

It should be appreciated that the tool path data generating system 13 is associated with a display unit 16 and an input unit 17 which comprises a keyboard, mouse and so forth, for example. The designer or engineer can enter operation data through the input unit 17 while visually observing a menu or displaced graphic image and so forth on the display unit 16. Based on the entered operation data and the machining data derived on the basis of the outer surface data $DT_s$ from the outer surface data generating system 12, the tool path data is derived.

Figure 2:
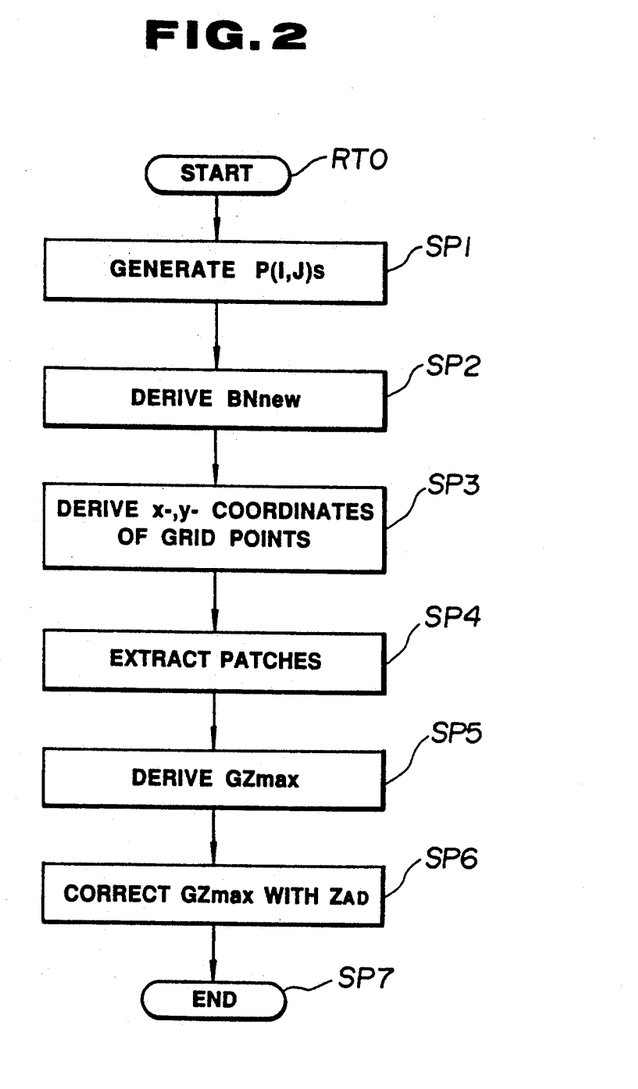
FIG. 2 is a flowchart showing the preferred process of the machining data generation to be performed for implementing the preferred, machining data generation method of the invention.
Figure 3:
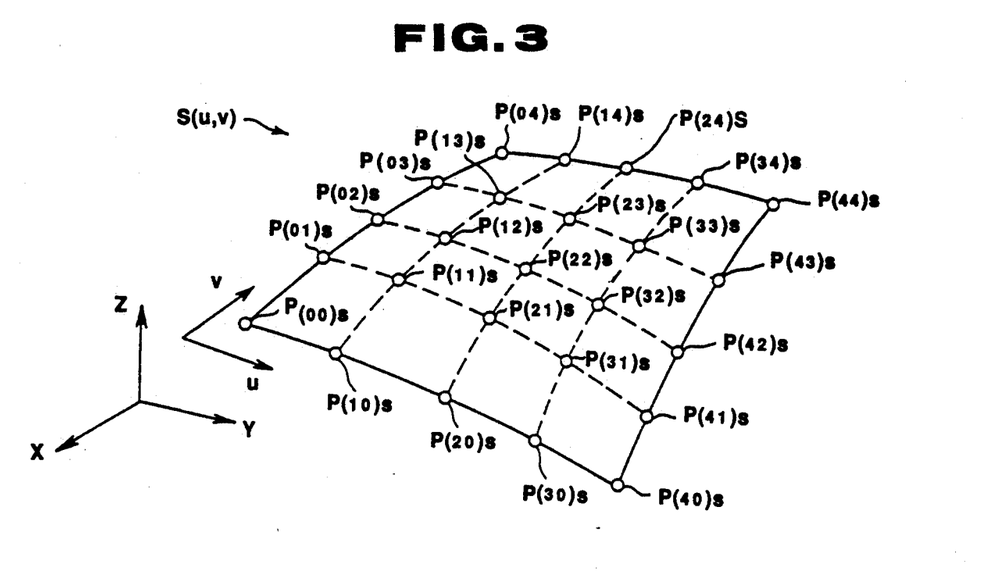
FIGS. 3,4,5,6,7A,7B,7C,8A,8B,9A,9B,9C, and 9D are illustrations used for explaining the respective processes at respective steps in the process of FIG. 2.

The CPU in the tool path data generating system 13 is responsive to a command entered through the input unit 17 for generating the tool outer surface data $DT_s$. The process of deriving the tool path data $DT_{CL}$ is illustrated in FIG. 2. This process begins execution at a step RTO. Subsequently, at a step $SP_1$, free surface data $DT_s$ defined by a plurality of patches $S(u, v)$ and representing the free surface to be machined is read out from the free surface data generating system 12. Subsequently, at the step $SP_1$, parameters defining each patch $S_{(u, v)}$ in the free surface data $DT_s$ are divided into a predetermined number BN in order to establish a plurality of segments in each patch. Through this process, each patch is defined by a plurality of point data, as shown in FIG. 3. In the shown example in FIG. 3, the parameters defining each patch are divided by four in u and v directions to produce sixteen segments. Therefore, in the shown example, the patch is defined by twenty-five dividing points $P_{(00)s} \sim P_{(04)s}$, $P_{(10)s} \sim P_{(14)s}$, $P_{(20)s} \sim P_{(24)s}$, $P_{(30)s} \sim P_{(34)s}$ and $P_{(40)s} \sim P_{(44)s}$. These dividing points as generally referred to will be hreinafter represented by $P_{(i,j)s}$, i, j = 0, 1, 2, 3, 4.

At a step $SP_2$, the distance between adjacent dividing points is derived. In the process of step $SP_2$, for dividing point $P_{(i,j)s}$, the distance in the x-coordinate component (distance in a projection on the X-Z plane of the coordinate system), the y-coordinate component (distances in projections on the X-Y plane and the Y-Z planes of the coordinate system) and the z-coordinate component (distances, in projections on the X-Z and the Y-Z planes) to dividing points $P_{(i+1,j)s}$, $P_{(i,j+1)s}$, $P_{i+1,j+1)s}$ are derived. Subsequently, from the result of the foregoing process of derivation of the distances between the adjacent dividing points maximum values $X_{dis}$, $Y_{dis}$ and $Z_{dis}$ are derived. These maximum values $X_{dis}$, $Y_{dis}$ and $Z_{dis}$ are compared with a predetermined criterion $R_{ref}$. This can be expressed by:

$$X_{dis} > R_{ref} \quad (7)$$

$$Y_{dis} > R_{ref} \quad (8)$$

$$Z_{dis} > R_{ref} \quad (9)$$

Therefore, a check is performed whether one of the formulae (7), (8) and (9) is satisfied. The predetermined criterion $R_{ref}$ is determined in relation to the radius R of the ball end mill BM so that the value of the predetermined criterion is smaller than or equal to the radius of the ball end mill. When one of the foregoing formulae (7), (8) and (9) is satisfied, an arithmetic process is executed to determine a new dividing number $BN_{new}$ so that the maximum values $X_{dis}$, $Y_{dis}$ and $Z_{dis}$ become smaller than the predetermined criterion $R_{ref}$. In practice, the new dividing number is derived through the following equation:

$$BN_{new} = (INT[D_{xys}/R_{ref}] + 1) \times BN \quad (10)$$

where
$D_{xys}$ is respective of the maximum values $X_{dis}$, $Y_{dis}$ and $Z_{dis}$ of the x-, y- and z-coordinate components; and INT[] is an operator for deriving the integer of the value in the parenthesis.

The foregoing process is performed for the patches having the maximum distances, one of which satisfies the foregoing formulae (7), (8) and (9). Through the foregoing process, the patches having greater maximum distances $X_{dis}$, $Y_{dis}$ and $Z_{dis}$ than the predetermined criterion $R_{ref}$ can be separated into smaller segments.

Furthermore, the maximum and minimum values $X_{max}$, $Y_{max}$, $Z_{max}$ and $X_{min}$, $Y_{min}$, $Z_{min}$ of x-, y- and z-coordinate components are derived. Subsequently, in a manner similar to that illustrated with respect to FIG. 15, the x- and y-coordinates of the respective grid points GP with pitches corresponding to the radius R of the drill DR and the curve radius RD of the ball end mill BM are set with respect to the overall area of the projection of the free surface projected on the X-Y plane, at a step $SP_3$. As previously explained in reference to the grid points set in the prior art process, the respective grid points are identified by x- and y-coordinates on the x-y coordinate system established on the X-Y plane and the combination of the grid points defines the free surface projection on the X-Y plane.

Figure 4:
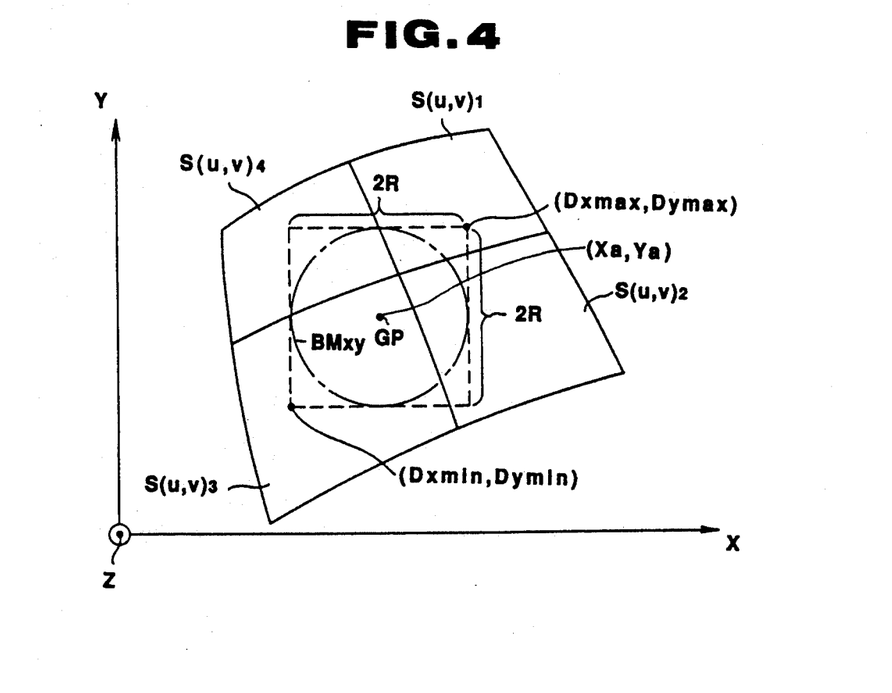

At a step $SP_4$, as shown in FIG. 4, with respect to each of the grid points, a projection of the ball end mill BM on the X-Y plane centering at each grid point GP is established. Then, patches $S_{u,v)}$ whose projections are oriented within an with an area $BM_{xy}$ of the projection of the ball end mill are extracted. In order to make a judgment whether the patches are oriented within or outside of the projection area $BM_{xy}$, a square region having an edge length corresponding to the diameter (2R) of the ball end mill, which is defined by the x- and y-coordinates of $D_{xmin}$, $D_{xmax}$, $D_{ymin}$, and $D_{ymax}$, is established. Then, these coordinate data $D_{xmin}$, $D_{xmax}$, $D_{ymin}$ and $D_{ymax}$ of the square are compared with the maximum and minimum coordinate values $X_{max}$, $X_{min}$, $Y_{max}$, $Y_{min}$ $Z_{max}$, and $Z_{min}$ to check whether the following formulae are satisfied:

$$X_{max} \geq D_{xmin} \quad (11)$$

$$X_{min} \leq D_{xmax} \quad (12)$$

$$Y_{max} \geq D_{ymin} \quad (13)$$

$$Y_{min} \leq D_{ymax} \quad (14)$$

$$Z_{max} + R > GZ_{max} \quad (15)$$

wherein $GZ_{max}$ represents the z-coordinate value of the grid point GP, which is set at a minimum value $Z_{min}$ of overall z-coordinate components on the free surface.

when all conditions set in the foregoing formulae (11), (12), (13), (14) and (15) are satisfied, a judgment can be made as to whether an X-Y projection of a given patch $S_{(u,v)}$ is oriented within the projection area $BM_{xy}$. At the process of the step $SP_4$, all patches whose X-Y projections are oriented within the projection area $BM_{xy}$ can be extracted. In the example of FIG. 4, four patches $S_{(u,v)1}$ to $S_{(u,v)4}$ are extracted with respect to the grid point GP a which the ball end mill BM is centered. The X-Y projection of each patch $S_{(u,v)1}$ to $S_{(u,v)4}$ encompasses 25 (i.e. 5X5) grid points, which appear as solid or hollow dots in FIG. 5. When another patch is oriented beneath the extracted patch, such patch may not be extracted because of a smaller maximum z-coordinate component $Z_{max}$ than that of the extracted patches. By this way, unnecessary interference with the tool path can be successfully avoided.

Figure 5:
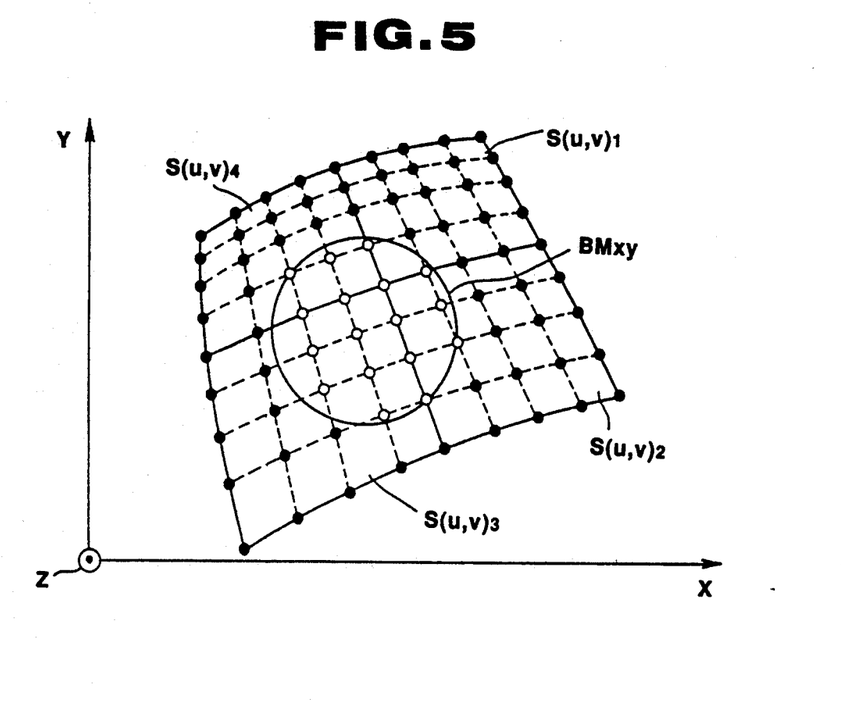

At a step $SP_5$, a further judgment is made as to whether the grid points $GP_{(ij)s1}$, $GP_{(ij)s2}$, $GP_{(ij)s3}$, $GP_{(ij)s4}$ on the X-Y projections of the extracted patches $S_{(u,v)1}$ to $S_{(u,u)4}$, respectively, are within a circular projection $BM_{xy}$ (centered at the grid point GP) of the ball end mill BM on the X-Y plane. In practice, a judgment whether the grid points $GP_{(ij)s1}$, $GP_{(ij)s2}$, $GP_{(ij)s3}$, $GP_{(ij)s4}$ are out of or within the circular projection area is performed through the following process. For the respective grid points $GP_{(ij)s1}$, $GP_{(ij)s2}$, $GP_{(ij)s3}$, $GP_{(ij)s4}$, the x- and y- coordinate component data are derived as $x_i$ and $y_i$. Subsequently, the x- and y- coordinate component data of the associated grid point GP of the center of the ball end mill BM are set as $x_a$ and $y_a$. Then, a circular area is calculated and compared with the radius R of the ball end mill BM through the following formula:

$$(x_i - x_a)^2 + (y_i - y_a)^2 \leq R^2 \qquad (16)$$

By substituting the data of the grid points $GP_{(ij)s1}$, $GP_{(ij)s2}$, $GP_{(ij)s3}$, $GP_{(ij)s4}$, grid points satisfying the foregoing formula are selected as those oriented within the circular projection. In the shown example of FIG. 5, the grid points identified by hollow circles (o) are the grid points judged as being oriented within the circular projection.

Keeping in mind that the machining matrix is three dimensional, so that there are grid points which are coincident with the patches, with respect to those of the grid points $GP_{ijs1}$, $GP_{(ij)s2}$, $GP_{(ij)s3}$, $GP_{(ij)s4}$ for which a judgment is made that they are oriented with the circular projection area, a z-coordinate position at which the center of the ball end mill BM comes into contact with each grid point on the patch is derived. Among a plurality of z-coordinate position data of the contact grid points, the highest point is selected.

Figure 6:
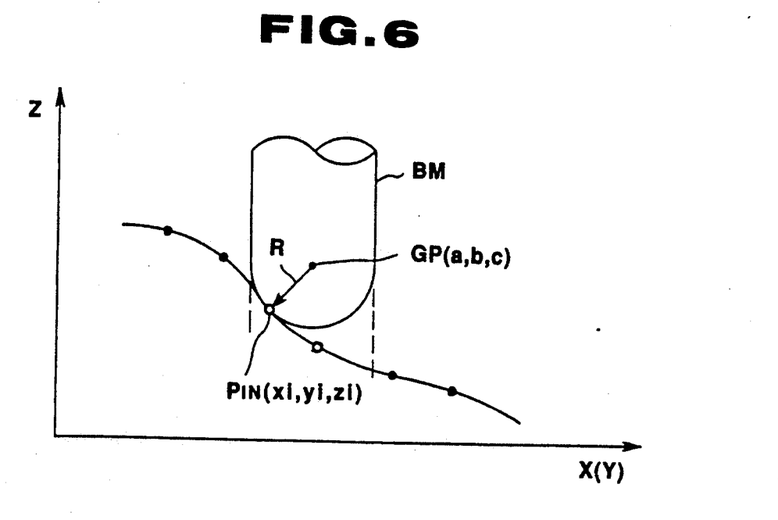

The z-coordinate of the center of the ball end mill is derived in the manner illustrated in FIG. 6. As shown in FIG. 6, from among each of the grid points $GP_{(ij)s1}$, $GP_{(ij)s2}$, $GP_{(ij)s3}$, $GP_{(ij)s4}$ on the patches $S_{(u,v)1}$ to $S_{(u,v)4}$, each grid point oriented within the circular projection BM is set as $GP_{IN}$ in the three-dimensional machining matrix. For the each point $GP_{IN}$, x-, y- and z-coordinate position data are derived as $x_i$, $y_i$ and $z_i$. The x-, y- and z-coordinate position data of a grid point GP at the center of the ball end mill BM is then set as $x_a$, $y_a$ and $z_a$. Then, the equation of a sphere is established:

$$(x_i - x_a)^2 + (y_i - y_a)^2 + (z_i - z_a)^2 = R^2 \qquad (17)$$

From the foregoing equation (17), the z-coordinate component $z_a$ can be derived by:

$$z_a = z_i + \sqrt{R^2 - \{(x_i - x_a)^2 + (y_i - y_a)^2\}} \qquad (18)$$

The z-coordinate position data $z_a$ thus derived is compared with the z- coordinate position data $GZ_{max}$ of the grid point GP to set a new grid point z-coordinate data $GZ_{max}$ which is the greater one of the two. Through this process, the grid point z-coordinate data $GZ_{max}$ can be set at the maximum value of the z-coordinate data $z_a$ of the points.

As can be appreciated, the process at the steps $SP_4$ and $SP_5$ are repeated for deriving z-coordinate data $GZ_{max}$ for all grid points GP.

Subsequently, at a step $SP_6$, in order to prevent excess milling or curving, correction for the z-coordinate data $GZ_{max}$ is performed with a predetermined correction value $Z_{AD}$. The corrected z-coordinate data is set as the grid point z-coordinate position data $GZ_{max}$. Subsequently, at a step $SP_7$, the process of generating the free surface data is finished.

Figure 7A:
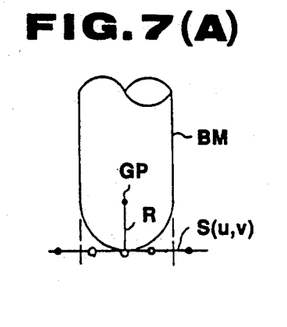

It should be noted that the correction value $Z_{AD}$ is determined with respect to the condition of the points $P_{IN}$ on the patches $S_{u,v)1}$ to $S_{(u, v)4}$, about Which the z-coordinate position data $GZ_{max}$ are derived through the foregoing process. Namely, as shown in FIG. 7(A), if the z-coordinate position data $GZ_{max}$ is derived with respect to one point $P_{IN}$ on one plane patch $S(u, v)$ defining the plane surface, the correction value can be derived from the following equation:

$$Z_{AD} = 0 + \delta \qquad (19)$$

where, again, $\delta$ is the value corresponding to the finishing margin. At this time, since the patch $S(u, v)$ is a plane, the maximum value $Z_{max}$ and minimum value $Z_{min}$ of the z-coordinate position are equal to each other. Therefore, the z-coordinate data $GZ_{max}$ at the grid point GP can be expressed by:

$$GZ_{max} = Z_{max} + R + \delta \qquad (20)$$

Figure 7B:
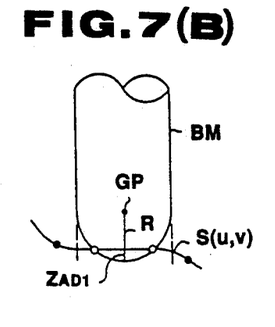
Figure 7C:
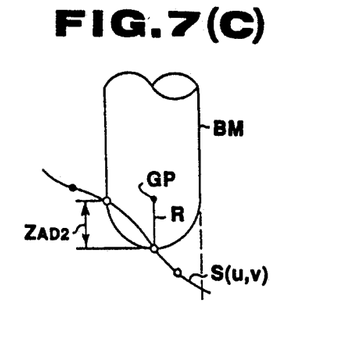

On the other hand, when the z-coordinate data $GZ_{max}$ of the grid point GP is derived with respect to one point $P_{In}$ on the patch $S(u, v)$ defining curved surface, the correction value $Z_{AD}$ may be derived by taking the surface configuration as illustrated in FIG. 7(B) into account and is expressed by:

$$Z_{AD1} = (R^2 - (\sqrt{3}/2 \times R_{ref})^2)^{\frac{1}{2}} + \delta \qquad (21)$$

or by taking the surface configuration as illustrated in FIG. 7(C) into account to be expressed by:

$$Z_{AD2} = R_{ref} + \delta \qquad (22)$$

Whichever is the greater of the values of $Z_{AD1}$ and $Z_{AD2}$ taken as the correction value $Z_{AD}$.

Figure 8A:
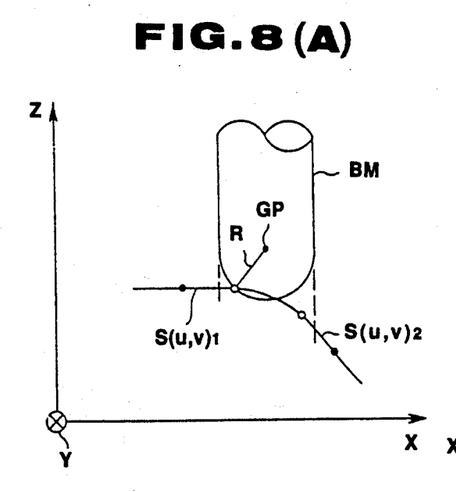
Figure 8B:
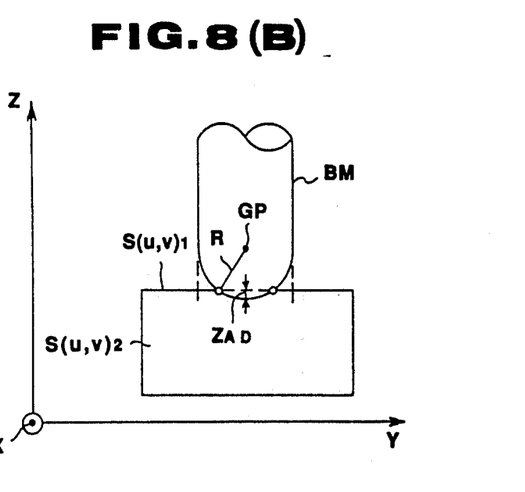

When the z-coordinate data $GZ_{max}$ of the grid point GP is common to more than one patch, e.g. $S(u, v)_1$ and $S(u, v)_2$, and when the point $P_{IN}$, based on which the z-coordinate data $GZ_{max}$ is derived, is oriented on one of the patches $S(u, v)_1$, the correction data $Z_{AD1}$ derived through the equation (21) is used as the correction value $Z_{AD}$.

Figure 9A:
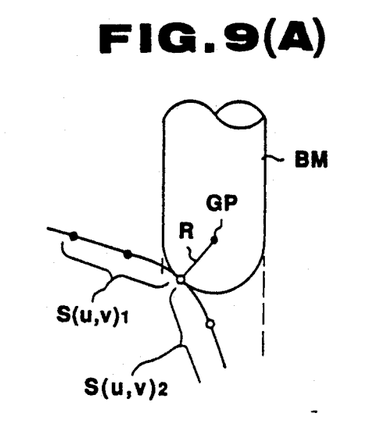
Figure 9B:
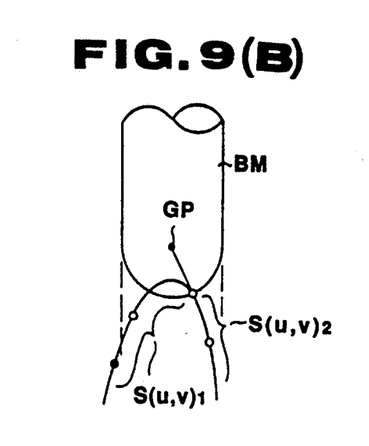
Figure 9C:
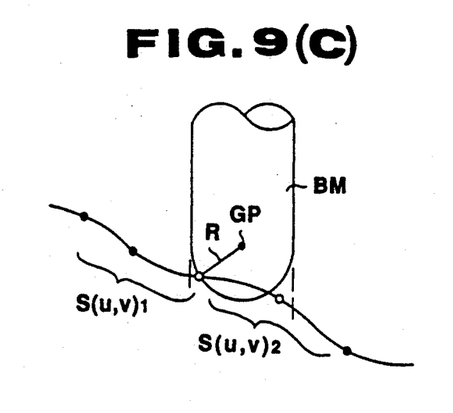
Figure 9D:
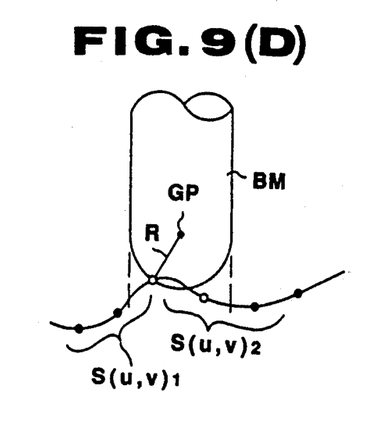

In addition, as shown in FIG. 9(A), when the z-coordinate data $GZ_{max}$ of the grid point GP corresponds to a minimum value $Z_{min}$ of one of the patches $S(u, v)_1$ and to a maximum value $Z_{max}$ of the other patch $S(u, v)_2$, the largest of the correction values $Z_{AD1}$ and $Z_{AD2}$ derived through the equations (21) and (22) is selected as the correction value $Z_{AD10}$ for the patch $S(u, v)_1$ and the correction value $Z_{AD1}$ derived through the equation (2i) is used as the correction value $Z_{AD20}$ for the other patch $S(u, v)_2$. Then, the greater of the correction values $Z_{AD10}$ and $Z_{AD20}$ is selected as the correction value $Z_{AD}$. Furthermore, various configurations of surfaces as shown in FIGS. 9(B) to 9(D) for example, can be treated by deriving respective correction values $Z_{AD11}$ and $Z_{AD21}$ through the equations (21) and (22) and the largest one is selected for use as the correction value. Furthermore, in case that both patches are flat planes, the correction value $Z_{AD}$ can be derived through the equation (19) as set forth above.

As can be appreciated herefrom, the surface data generating process, according to the present invention, does not require the establishment of an offset surface. Therefore, the surface condition which may cause discontinuity on an offset surface does not affect the generation of the machining data. Furthermore, according to the invention, since the segments formed by dividing the respective patches are formed so that the size thereof is smaller than a given value determined according to the size of the mill to be used, one or more patches oriented on the projection of the mill is selected, and the maximum value of the z-coordinate value at the contact point where the mill contacts is established, it becomes possible to generate free surface machining data for rough machining without generating the offset surface.

While the present invention has been discussed hereabove in terms of the preferred embodiment of the invention, the invention should be appreciated to be restricted for the shown embodiment. The invention can be embodied in various fashion. Therefore, the invention should be interpreted to include all possible embodiments and modifications which can be embodied without departing from the principle of the invention set out in the appended claims.

Although the shown embodiment divides the parameters of the respective patches and compares the distance between the adjacent dividing points with a reference value corresponding to the radius of the ball end mill, the reference value may be set at any value as long as it is smaller than the radius of the ball end mill. By setting the reference value at a smaller value than the radius of the ball end mill, the accuracy in the z-coordinate values can be enhanced to prevent the occurrence of any machining error.

Furthermore, although the shown embodiment is exemplified by the process for generating the machining data of a frame space defined by a plurality of quadrilateral patches each of which is expressed by tertiary Bezier formula, it may be possible to employ patches defined by biquadratic or higher degree Bezier formulae. Furthermore, the configuration of the patch is not necessarily limited to the quadrilateral but can be triangular or any appropriate configuration. Furthermore, the patch may also be expressed by B-spline formula or Furgason's formula.

What is claimed is:

1. A method for controlling the machining depth along a tool path of a numerically controlled machine of the type having a machining tool of a known configuration using data defining a three-dimensionally curved surface, the method comprising the steps of:
   (a) dividing the three-dimensionally curved surface into a plurality of patches;
   (b) subdividing each of the patches to establish a plurality of dividing points;
   (c) comparing the distance between adjacent dividing points with a given value which is derived in relation to the size of the machining tool;
   (d) when the distance as compared at the step (c) is greater than the given value, repeatedly subdividing the patches until the distances between each of the adjacent dividing points become smaller than the given value, to thereby form new, smaller patches;
   (e) projecting the patches formed in step (d) onto a three dimensional machining matrix projected onto an X-Y plane, projecting the machining tool onto the machining matrix in the X-Y plane and selecting those patches whose projections on the machining matrix are located within the projection of the machining tool;
   (f) selecting a plurality of grid points on the machining matrix which lie within the projection of the patches determined in step (e) and which are inside of the projection of the machining tool onto the X-Y plane;
   (g) calculating the maximum height of the center of the machining tool where the machining tool contacts each of the selected grid points;
   (h) adding a predetermined correction value to the maximum height for determining the height position data of the machining tool along the tool path; and
   (i) controlling the machining depth of the machining tool along the tool path as a function of the height position data determined in step (h).

2. A method as set forth in claim 1, wherein the predetermined correction value ($Z_{AD}$) is derived from one of the following equations:

$$Z_{AD} = \delta \text{ or}$$

$$Z_{AD} = (R^2 - (\sqrt{3}/2 \times R_{ref})^2)^{\frac{1}{2}} + \delta \text{ or}$$

$$Z_{AD} = R_{ref} + \delta$$

where R is radius of the machining tool; $R_{ref}$ is a reference value ($R_{ref} \leq R$); and $\delta$ is a value corresponding to a finishing margin.

3. A method for controlling the machining depth along a tool path of a numerically controlled machine of the type having a machining tool of a known configuration using data defining a three-dimensionally curved surface, the method comprising the steps of:
   (a) dividing the three-dimensionally curved surface into a plurality of patches;
   (b) subdividing each of the patches to establish a plurality of dividing points;
   (c) comparing the distance between adjacent dividing points with a given value which is derived in relation to the size of the machining tool;
   (d) when the distance as compared at the step (c) is greater than the given value, subdividing the patch again until the distances between each of the adjacent dividing points become smaller than the given value;

(e) projection the patches formed in step (d) onto a three dimensional machining matrix projected onto an X-Y plane, projecting the machining tool onto the machining matrix in the X-Y plane and selecting those patches whose projections on the machining matrix are located within the projection of the machinin tool on the machining tool matrix;

(f) selecting a plurality of grid points on the machining matrix which lie within the projection of the patches determined in step (e) and which are inside of the projection of the machining tool onto the machining matrix according to the formula:

$$(x_i - x_a)^2 + (y_i - y_a)^2 \leq R^2$$

where $x_i$, $y_i$ are x- and y-coordinate components of a grid point on the patches selected in step (e);

$x_a$, $y_a$ are x- and y- coordinate components of the grid point aligned with the center of the machining tool; and R is radius of the machining tool;

(g) calculating the maximum height of the center of the machining tool where the machining tool will contact each of the grid points;

(h) adding a predetermined correction value to the maximum height for determining the height position data of the machining tool along the tool path; and (i) controlling the machining depth of the machining tool along the tool path as a function of the height position data determined in step (h).

4. A method for controlling the machining depth along a tool path of a numerically controlled machine o the type having a machining tool of a known configuration using data defining a three-dimensionally free curved surface to be machined, the method comprising the steps of:

(a) dividing the three-dimensionally free curved surface into a plurality of patches $S_{(u,v)}$;

(b) subdividing each of the patches $S_{(u,v)}$ to establish a plurality of segments in each patch, with each patch thereby being defined by a plurality of dividing points;

(c) comparing the maximum distances between adjacent dividing points with a given value which is smaller than the size of the machining tool;

(d) when any of the distances as compared at the step (c) is greater than the given value, repeatedly subdividing the patches $S_{(u,v)}$ until the distances between each of the adjacent dividing points become smaller than the given value;

(e) setting x- and y-coordinates of respective grid points GP of a three dimensional machining matrix MTX projected on an X-Y plane with respect to an overall area of a projection of the free curved surface on the X-Y plane, the grid points having pitches corresponding to a dimension of the machining tool, wherein a combination of the grid points defines the free surface projection on the X-Y plane;

(f) projecting the machining tool, with respect to each of the grid points GP, on the X-Y plane, centering at each grid point;

(g) extracting patches $S_{(u,v)}$ whose projections onto the X-Y plane are oriented within an area $BM_{xy}$ of the X-Y plane projection of the machining tool;

(h) selecting a plurality of grid points on the machining matrix which lie within the X-coordinate Y plane projection of the patches determined in step (g) and which are inside of the projection of the machining tool onto the X-Y plane;

(i) calculating the maximum height of the center of the machining tool when the machining tool will contact with each of the grid points;

(j) adding a predetermined correction value to the maximum height for determining the height position data of the machining tool along the tool path; and (k) controlling the machining depth of the machining tool along the tool path as a function of the height position data determined in step (j).

5. A method for controlling the machining depth along a tool path of a numerically controlled machine according to claim 4, step (g) comprises the further steps of:

(1) establishing a square region on the X-Y plane having an edge length corresponding to a diameter (2) of the machining tool, which is defined by x- and y-coordinates of $D_{xmin}$, $D_{xmax}$, $D_{ymin}$, and $D_{ymax}$, in order to make a judgment whether the X-Y plane projections of the patches are oriented within or outside of the X-Y plane projection area $BM_{xy}$;

(m) comparing these coordinate data $D_{xmin}$, $D_{xmax}$, $D_{ymin}$ and $D_{ymax}$ of the square with the maximum and minimum coordinate values $X_{max}$, $X_{min}$, $Y_{max}$, $Y_{min}$, $Z_{max}$ and $Z_{min}$ to check whether the following formulae are satisfied:

| | |
|---|---|
| $X_{max} \geq D_{xmin}$ | (11) |
| $X_{min} \leq D_{xmax}$ | (12) |
| $Y_{max} \geq D_{ymin}$ | (13) |
| $Y_{min} \leq D_{ymax}$ | (14) |
| $Z_{max} + R > GZ_{max}$ | (15) | wherein $GZ_{max}$ represents a z-coordinate value of a grid point GP, which is set at a minimum value $Z_{min}$ of the overall z-coordinate components of the free surface; and (n) extracting each patch $S_{(u,v)}$ as one whose X-Y plane projection is oriented within the projection area $BM_{xy}$ when all conditions set in the foregoing formulae (11), (12), (13), (14) and (15) are satisfied.

6. A method for controlling the machining depth along a tool path of a numerically controlled machine according to claim 4, wherein step (h) comprises the further step of:

(o) determining whether there are grid points $GP_{(ij)s1}$, $GP_{(ij)s2}$, $GP_{(ij)s3}$, $GP_{(ij)s4}$ on a plurality of extracted patches $S_{(u,v)1}$ to $S_{(u,v)4}$, respectively, which are within the circular projection area $BM_{xy}$ (centered at a grid point GP) of the machining tool.

7. A method for controlling the machining depth along a tool path of a numerically controlled machine according to claim 6, wherein the step (o) of determining whether the grid points $GP_{(ij)s1}$, $GP_{(ij)s2}$, $GP_{(ij)s3}$, $GP_{(ij)s4}$ are out of or within the circular projection area $BM_{xy}$ comprises the steps of:

(p) deriving x- and y- coordinate component data $x_i$ and $y_i$ for the respective grid points $GP_{(ij)s1}$, $GP_{(ij)s2}$, $GP_{(ij)s3}$, $GP_{(ij)s4}$;

(q) setting the x- and y- coordinate component data of the associated grid point GP of the center of the machining tool and $X_a$ and $Y_a$;

(r) calculating a circular area and comparing it with the radius R of the machining tool through the following formula:

$$(x_i - x_a)^2 + (y_i - y_a)^2 \leq R^2 \quad (16);$$

and (s) substituting the data of the grid points $GP_{(ij)s1}$, $GP_{(ij)s2}$, $GP_{(ij)s3}$, $GP_{(ij)s4}$ to find grid points satisfying the foregoing formula (16) as those oriented within the circular projection.

8. A method for controlling the machining depth along a tool path of a numerically controlled machine according to claim 7, comprising the further step of:

(t) deriving with respect to these of the grid points $GP_{(ij)s1}$, $GP_{(ij)s2}$, $GP_{(ij)s3}$, $GP_{(ij)s4}$ for which a judgment is made in step (s) that they are oriented within the circular projection area, a z-coordinate position at which the center of the machining tool comes into contact with a grid point; and (u) selecting a highest grid point from among the plurality of z-coordinate position data determined in step (t).

9. A method for controlling the machining depth along a tool path of a numerically controlled machine according to claim 8, wherein the step (t) comprises the steps of:

(v) sequentially setting those of the grid points $GP_{(ij)s1}$, $GP_{(ij)s2}$, $GP_{(ij)s3}$, $GP_{(ij)s4}$ selected in step (s) as $GP_{IN}$;

(w) deriving for the each grid point GPhd IN, x- , Y- and z-coordinate position data as $x_i$, $y_i$ and $z_i$;

(x) setting the x-, y- and z-coordinate position data of a grid point GP which is at the center of the machining tool as $x_a$, $y_a$ and $z_a$;

(z) establishing the equation of a sphere as:

$$(x_i - x_a)^2 + (y_i - y_a)^2 + (z_i - z_a)^2 = R_2 \quad (17);$$

and (aa) deriving from the foregoing equation (17), the z-coordinate component $z_a$ as:

$$z_a = z_i + \sqrt{R^2 \{(x_i - x_a)^2 + (y_i - y_a)^2\}} \quad (18)$$

10. A method for controlling the machining depth along a tool path of a numerically controlled machine according to claim 9, wherein the step (u) further comprises the steps of:

(ab) comparing the z-coordinate position data $z_a$ thus derived in step (aa) with the z-coordinate coordinate position data $GZ_{max}$ of the grid point GP and setting a new grid point z-coordinate data $GZ_{max}$ which is the greater one of the two and by this process setting the grid point z-coordinate data $GZ_{max}$ at the maximum value of the z-coordinate data $z_a$ of the grid points; and (ac) repeating the steps (v) to (ab) to derive z-coordinate data $GZ_{max}$ for all grid points GP derived in step (s).

11. A method for controlling the machining depth along a tool path of a numerically controlled machine according to claim 10, wherein step (ab) comprises the further steps of:

(ad) performing correction of the z-coordinate data $GZ_{max}$ with a predetermined correction value $Z_{AD}$ in order to prevent excess milling or curving; and (ae) setting the z-coordinate data as corrected in step (ad) as the grid point z-coordinate position data $GZ_{max}$.

12. A method for controlling the machining depth along a tool path of a numerically controlled machine according to claim 11, wherein the correction value $Z_{AD}$ is determined as follows:

(af) if the z-coordinate position data $GZ_{max}$ is derived with respect to one grid point $G_{IN}$ on one plane patch $S_{(u,v)}$ defining a plane surface, the correction value is derived from the following equation:

$$Z_{AD} = \delta \quad (19)$$

where, $\delta$ is a value corresponding to a finishing margin, the patch $S_{(u,v)}$ is a plane so tha the maximum value $Z_{max}$ and minimum value $Z_{min}$ of the z-coordinate position are equal to each other, and the z-coordinate data $GZ_{max}$ at the grid point GP is expressed by:

$$GZ_{max} = Z_{max} + R + \delta \quad (20);$$

(ag) if the z-coordinate data $GZ_{max}$ of the grid point GP is derived with respect to one grid point $GP_{IN}$ on a patch $S_{(u,v)}$ defining a curved surface, the correction value $Z_{AD}$ is derived by:

$$Z_{AD1} = (R^2 - (\sqrt{3}/2 \times R_{ref})^2)^{\frac{1}{2}} + \delta \quad (21)$$

or by:

$$Z_{AD2} = R_{ref} + \delta \quad (22)$$

and whichever is the greater of the values of $Z_{AD1}$ and $Z_{AD2}$ is taken as the correction value $Z_{AD}$; and whichever is the greater of the values of $Z_{AD1}$ and $Z_{AD2}$ is taken as the correction value $Z_{AD}$;

(ah) if the z-coordinate data $GZ_{max}$ of the grid point GP is common to more than one patch, e.g. $S_{(u,v)1}$ and $S_{(u,v)2}$, and the grid point $GP_{IN}$, based on which the z-coordinate data $GZ_{max}$ is derived, is oriented on one of the patches $S_{(u,v)1}$, the correction data $Z_{AD1}$ derived through the equation (21) is used as the correction value $Z_{AD}$;

(ai) if the z-coordinate data $GZ_{max}$ of the grid point GP corresponds to a minimum value $Z_{min}$ of one of the patches $S_{u,v)1}$ and to a maximum value $Z_{max}$ of another patch $S_{(u,v)2}$:

(i) the largest of the correction values $Z_{AD1}$ and $Z_{AD2}$ derived through the equations (21) and (22) is selected as the correction value $Z_{AD10}$ for the patch $S_{(u,v)1}$ and the correction value $Z_{AD1}$ derived through the equation (21) is used as the correction value $Z_{AD20}$ for the patch $S_{(u,v)2}$;

(ii) the greater of the correction values $Z_{AD10}$ and $Z_{AD20}$ is selected as the correction value $Z_{AD}$.

* * * * *